(12) United States Patent
Harris

(10) Patent No.: US 8,083,577 B2
(45) Date of Patent: Dec. 27, 2011

(54) ELECTRONIC GAME WITH ACTIONS BASED ON REAL STATISTICS

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 574 days.

(21) Appl. No.: 12/254,009

(22) Filed: Oct. 20, 2008

(65) Prior Publication Data

US 2010/0099472 A1    Apr. 22, 2010

(51) Int. Cl.
    *G06F 17/00* (2006.01)
(52) U.S. Cl. .......................................................... 463/2
(58) Field of Classification Search .................. 463/1–4, 463/16–25; 273/317.1–317.6
    See application file for complete search history.

(56) References Cited

U.S. PATENT DOCUMENTS

| | | | | |
|---|---|---|---|---|
| 5,118,105 A | * | 6/1992 | Brim et al. | 473/58 |
| 5,626,523 A | * | 5/1997 | Mowers et al. | 473/58 |
| 5,709,607 A | * | 1/1998 | Mowers et al. | 473/58 |
| 6,402,154 B1 | * | 6/2002 | Hess et al. | 273/317.5 |
| 6,439,575 B1 | * | 8/2002 | Castellanos | 273/317.5 |

* cited by examiner

*Primary Examiner* — Ronald Laneau

(74) *Attorney, Agent, or Firm* — Law Office of Scott C. Harris, Inc.

(57) ABSTRACT

Sports based computer game, e.g., football game, is played using data from actual games. Updates are received about new information from more recent games. Each game is divided into plays, and each play is characterized so that the play can be replayed on the game. Characteristics of the plays can be changed to simulate what is scenarios.

22 Claims, 1 Drawing Sheet

ELECTRONIC GAME WITH ACTIONS BASED ON REAL STATISTICS

BACKGROUND

Different kinds of computer-based games can be played over computers of different types including general purpose computers, and special purpose computers such as gaming consoles such as the Sony Playstation, or Nintendo Wii. Many of these are user-controlled games, which allow the user to take control of certain aspects of the game. Team games, for example, may allow the user or users to control actions of certain players.

SUMMARY

An embodiment describes a sports based game in which statistics of real actions that have occurred in real world sports events are obtained by a storage associated with the playing of the game, and used to control actions in the computer based game based on actions that occur in the real world sports events.

An embodiment describes a football game which stores information indicative of game play, including information indicative of individual plays during the game, information of statistics during the game, e.g., statistics as a function of other features, e.g., players, time, etc, which defines an analogous statistic to the way things happen in real football games.

One aspect describes updating the game to provide statistics of recently played games in order to determine the statistics.

Another aspect describes using recently played games to set parameters for the games that are played.

Another aspect defines ways to avoid pirating of the software.

DETAILED DESCRIPTION

Figure 1:
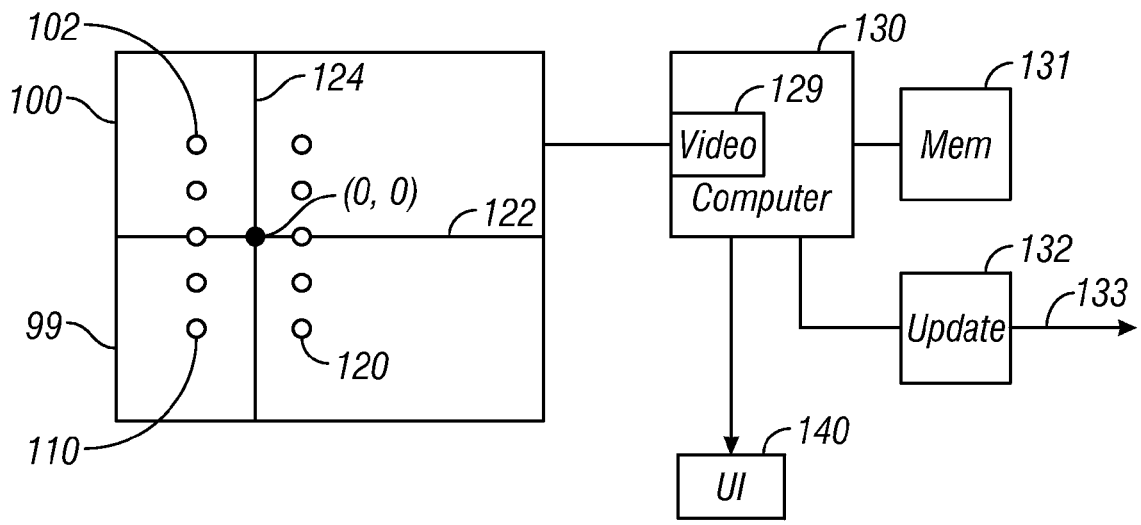
FIG. 1 shows a computer and the screen shown by that computer.

The present application describes a football game, played using statistical techniques which are obtained from real gameplay. While the above refers to American football, it should be understood that these same techniques can be used in any sport including but not limited to soccer, rugby, hockey, baseball, tennis, volleyball, or any other game which has the capability of being played in the real world, and which also allows simulated playing on a computer.

A system 99 includes a display screen 100 driven by an output from a computer 130. The screen shows features and actions that are based on information that is created by the computer 130, e.g., by a video chip or card 129 within the computer 130. The screen may show players such as 102, e.g., from different teams. The first team 110 is shown facing the players from second team 120. These players are controlled on the screen based on controls from a user interface 140 associated with computer 130.

The computer 130 can be for example a game console such as the Sony PlayStation, or alternatively can be a personal computer or any other kind of computer. The user interface can be a mouse or gaming controller, or any other device that is capable of accepting commands. The computer operates based on information in memory 131, which can be solid state memory, a hard drive or other source of nonvolatile read/write memory. This may also include a read only memory reader, for a CD or other type device. The memory 131 in this embodiment may store information about specific game plays.

The computer also includes a capability of obtaining updates, here shown generally as 132. Different ways of obtaining the updates are contemplated according to the embodiments. The computer may be connected to the Internet 133 either via a wire or wirelessly. The Internet connection can be a cell phone connection, for example, a Bluetooth connection, or any other connection. The updates maybe obtained over the network connection. In one embodiment, the entire game may be played over a network, and the updates are obtained as part of playing the game over the network.

Alternatively, the update device 133 can accept external memory, e.g., CDs or USB memories, or other non-volatile memory, which plug-in and receive updates from the system about more recent statistics to use as part of the game play shown generally as 99.

In an embodiment, plays which were made recently, e.g., in recent games, are organized into a form that describes those plays and allows using information from those plays to form play within the computer game. In one embodiment, a user may have selection over the parts from the recent plays can be used. Another embodiment may select this, or do it randomly. Information from recent plays can include, for example, run vs throw, distance of the run or throw, formation of the offensive or defensive line, the specific "play", e.g., movement and location of the players and the paths that they follow, effectiveness of the offensive and/or defensive line, and others.

For example, during football season, each of the 32 NFL teams may play a game, meaning 16 games per week. An average football game has 125 plays, each lasting an average of 7 seconds. Each side has 11 players on the field for each game. Therefore, the following data is accumulated for each "play" of the game:
- play number
- ball location
- location of each player over time
- strength of each player relative to other players who come into contact with that player.
- effectiveness of the player in their action, e.g., did they block correctly, carry the ball correctly, catch or throw the ball correctly?

Each of these plays are either successful or unsuccessful. The way in which they are successful or unsuccessful depends upon the reaction of the other team to the play. The plays may be offensive or defensive. Maneuvers during the offensive plays may include ways to pass, running, fakes, laterals etc. The defense of plays may also have an aspect, for example there may be blitzes, number of men on the line, etc.

In addition, other parameters may be relevant, such as a player's statistics against a specific against team, the dates, the weather, and the like.

Each movement of each player within the play is monitored and graphed into a form that represents the player's action during the play. FIG. 1 shows a representation of the playing field used for forming the simulated game, and also for monitoring the game. For each time interval, e.g., each 0.2 second, each player's movements are mapped. These movements may be defined in terms of Cartesian coordinates relative to the origin, where the origin can be the point of scrimmage represented by 0,0, and a coordinate system can be defined with x axis 122, and y axis 124.

The position of each player is monitoring throughout the play. The position of the ball is also set, e.g., by a bit or flag indicating ball positions, or by a separate variable.

All of this is organized into a data structure or "database" of information about plays that actually occurred during actual games. The database is stored in memory 131, updated periodically from update element 132. This has information on where everybody was during that play, the "result" (gain, loss, interception, incomplete pass, penalty) and other information about the play. According to the embodiment, later people can replay that play, and carry out various operations when they replay that play. Different ways of using the "actual game information" are described herein.

One option is to choose the plays. The members 102 of teams 100 and 120 reenact the play exactly. When you reenact the play exactly, you may have exactly the same results as the original play. For example this may result in an interception, a gain of 10 yards, a loss of 2 yards, whatever the database 132 indicates as the "result". That could be used just as a matter of replaying the game.

Another embodiment may store actual video of the plays, to allow studying/watching the actual video along with watching or playing the game. For example, the video may be played in a picture-in-picture manner with the game itself.

Figure 2:
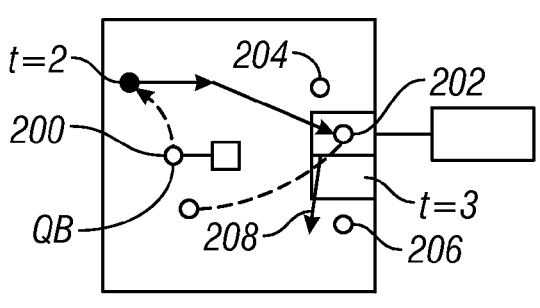
FIG. 2 shows a play in action.

Different parts of the plays can be changed to simulate the result. For example, when watching the game you may notice that you think certain things should have been done differently. The system may give you the option to edit parts of the play. For example, a play may be as shown in the screen of FIG. 2 where you see a quarterback 200 getting the ball, and at time t=2, passing the ball to player number x, who at time t=3.2 is at the location 202 in order to receive the ball. However, there may also be defenders such as 204 and 206 who were close to player X when they reached the reception point 202. One aspect allows a player to select any aspect or area to change and simulate what might have happened. For example, you might be able to select the point 200 to and drag that to a different location shown by the arrow 208. The player could select the time T=3.2 and change that to a different time. The player can select the defenders and make them disappear, or make additional defenders appear.

For example, if there was a blocked pass, the player could move or remove the defender that blocked the pass. The play could be simulated without that defender.

The gameplay operates according to statistics stored in the memory 131. These statistics may keep actual track of the fact that when a receiver gets to a point such as 202, and has quarterback 200, and specified types of defenders, then the pass will be received 78% of the time (using the hypothetical statistic here of 78%). Statistics from the actual game or from any subset of games, e.g., all games, all games between these teams, etc can be used. These statistics from the database to decide whether a pass is completed or not. Then, the pass will be completed 78% of the time. However, the pass completion value may get higher if you only have one defender, for example it may get to 99% if you only have one defender. Alternatively, the statistics may set which plays allow passes can be received.

The characteristics of the play can also be used—for example in the above example where the defender is removed, other defenders may move to open spots according to their statistical likelihood of covering open areas.

Another aspect is that the game player can choose the different percentages.

Another "mode" is called the beat the percentages mode. For example, during the game, any time a receiver got to a location within 3 seconds to get to a specified point on the field, got away from the defenders, the ball was received. In this mode of the game, if you do that within 3 seconds in the framework of the actual plays that were occurring in actual games, you will always catch the ball.

FIG. 2 illustrates how different aspects can be planned, but in addition, it is possible for the user to zoom first-person control of any one of the characters. Since a user can not easily assume first-person control of multiple characters at once, it may be desirable to set different characteristics that are going to occur, for example inform the system what is going to happen when the quarterback is going to throw, and allow the user to use their system to control the actual position of the receiver. For example, the quarterback is going to throw at time t=3 seconds, and the defense is going to be some defense that occurred in an actual game. The game player's job then is to get free of the defenders, while keeping in mind that the defenders will act like the real defenders did in that real play.

The game can be made more fun by changing difficulty levels, for example making it easier to play against certain defenders.

When playing the game, the other team reacts based on how the real other team reacted in some games, either randomly in some previous game, or in the most recent game, however you select. The user can also select a number of other characteristics, as part of the game, as shown in FIG. 2. For example, the user can select the against team, how often do I want to win; where this can be always, unless I make a blunder in the play, and do we carry blunders onto other plays. Selections can also be randomized so that the system selects some variables at random.

Each player's movement is described in terms of x and y positions as shown in FIG. 2. The system also maintains rules about intersections when you are controlling a character, getting near another character may allow a handoff. As long as you are controlling certain characters who have the ball, and are in a possible location, you can allow throwing according to rules. The throwing can use the mouse or trackball or game controller.

Another embodiment may allow mixing players from different teams and using statistics from actual games associated with those players, to play a game with hand picked players and teams.

Another aspect may allow a kung fu control, where during certain parts of the play, everything including motions of all players, and playback of videos of actual play if any, occurs in slower motion, e.g., ½ or ¼ motion. This may happen automatically at certain actions, e.g., when you start to aim, and you are controlling the quarterback, everything may slow down.

Figure 3:
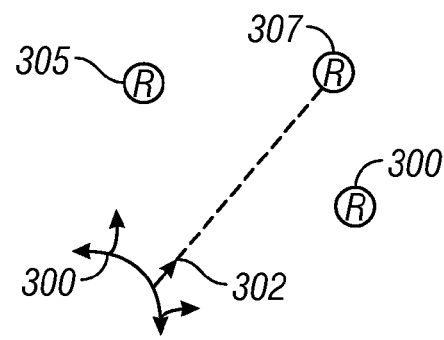
FIG. 3 illustrates aiming.

According to one aspect, the controlling with the aim may allow tilting the mouse or controller back and forth as shown in FIG. 3. By tilting the mouse or trackball, the direction of tilt sets the direction in which the ball will be thrown such as 302. During the aiming, another motion sets the range of throw. There may be a number of receivers within the area of throwing, shown as 305, 306, 307. When the proper area of throwing is set, a receiver becomes bolded, that is when the trackball is set properly so that the arrow 302 is facing right at the receiver 307, then the receiver 307 becomes bolded.

Another mode may automatically aim at the play recipient, in order to simplify the game.

During another mode, the player sets in advance all the options they want, including throw/run, who to receive, or which or multiple receivers can receive depending on who is open, when, and other options. The user may then just watch, or may override the play if the coverage changes. In one embodiment, the user may pause the play and re-set the parameters, e.g., change to handoff when the player sees an opening.

Receivers may receive the ball as a function of coverage and statistics according to game parameters as set. One statistic is that you will make a good reception if you are a distance x from a defender. You can also set the computers to follow statistics, e.g., to receive only in circumstances that the receiver received in the real game. In an easy mode of the game, you can set the receiver to always receive the ball that is thrown so long as that wall is thrown properly.

The statistics in all forms are the same according to game stats, where the game stats can be overall, just in the last game, or according to any game, how often does player X successfully do something as a function of number of defenders, time to do it, and any other parameter of the game. This can include receivers, quarterbacks, runners, and everything else.

A runner may statistically get 2.6 yards, with a standard deviation of 4 yards, which may depend entirely upon the defense's posture and play adopted by the defense. That play can be set by the user, can be set statistically, or otherwise.

One important advantage of this system is that it requires updates, and the updates can force the user to validate themselves to a system computer. This can be used to prevent pirating of software. While pirating of the software is of course an important issue in any jurisdiction, it is noted that certain jurisdictions such as South America seem to have defacto acceptance of pirated software. One of the important parts of this game is the fun that is obtained from getting new statistics, the ability to follow previous games, the ability to have people act like they did in previous games. If a player is "hot", that player can be hot in the game. If a player is not so hot, that player can be not in the game. You can play a game or replay a game the way you would have liked your team to have actually done in the game. You can replay certain plays with "what if" scenarios.

All these things are possible because of the updates. Pirated software might not be available to get the updates.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the above describes certain kinds of operation over the internet, any other way of interacting via a shared network can be similarly done in this way. Another embodiment may operate over a wholly internet and/or wireless system, or other kinds of gaming systems. The techniques disclosed herein can be used with other sports, including baseball, in which pitches and hits can be characterized from real games; tennis, in which volleys and the kinds of returns can be characterized, soccer, in which player speed and defense can be characterized, and any other game.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system, comprising:
   a storage unit, including a non-transitory medium storing information indicative of actions that occurred during actual games of a sports game;
   an update unit, receiving new information about actions that occurred during actual games of the sports game and storing said new information in said storage unit; and
   a game playing computer, accepting inputs indicative of game play of a simulated sports game, and producing an output that allows viewing the simulated sports game that is played using said inputs and also using said information from said storage unit and said new information from said storage unit, and where said game is also played by running a program using said computer and said storage unit on said non-transitory medium and using said inputs, said information, and said new information.

2. A system as in claim 1, wherein said actual games are professional sports games.

3. A system as in claim 1, wherein said actual games are games of team play, and said actions include movements of each of a plurality of players for the game.

4. A system as in claim 1, wherein said actions include an indication of whether each specified action had a successful result within the game.

5. A system as in claim 1, wherein said information indicative of actions includes statistical information about said games.

6. A system as in claim 1, wherein said storage unit also stores video information for game play of the simulated sports game, and said game playing computer controls playing said video information as part of said viewing.

7. A system as in claim 1, wherein said inputs cause changing a characteristic of said actions that occurred during said actual games.

8. A system as in claim 7, wherein said inputs change positions of players relative to their positions indicated by said information of actions during the actual game.

9. A system as in claim 1, wherein said sports game is football, and said information is information about players in different downs of said football game.

10. A system, comprising:
- a storage unit, including a non-transitory medium storing information indicative of different plays that occurred during at least one actual football game;
- an update unit, coupled to said storage unit, and receiving new information about newer plays than said different plays, said new information being about actions that occurred during newer games of the actual football game which are more recent than games which already have information in said storage unit, said new information stored in said storage unit; and
- a game playing computer, accepting inputs indicative of controls with a simulated football game, and producing an output that allows viewing the simulated football game that is played using: 1) said inputs and also using 2) said information from said storage unit and also using 3) said new information from said storage unit, and where said game is also played by running a program using said computer and using said inputs and using said storage unit with said non-transitory medium, and said information, and said new information.

11. A system as in claim 10, wherein said information in said storage unit includes information about movements of each of a plurality of players for the game.

12. A system as in claim 10, wherein said actions comprise positions of different players, each position of each different player being at a specific time during each of a plurality of plays.

13. A system as in claim 10, wherein said actions include an indication of an amount of yardage gain in said football game.

14. A system as in claim 10, wherein said information includes statistical information about said plays within said newer games.

15. A system as in claim 10, wherein said storage unit also stores video information of the football games associated with said information for the simulated football game, and said game playing computer controls playing said video information as part of said viewing.

16. A system as in claim 10, wherein said inputs cause changing a characteristic of said actions that occurred during said actual games.

17. A system as in claim 16, wherein said inputs change positions of players relative to their positions indicated by said information during the actual game.

18. A method of playing a game on a computer, comprising:
- storing information indicative of actions that occurred during actual games of a sports game on a non-transitory medium associated with a computer;
- receiving new information about actions that occurred during actual games of the sports game and storing said new information in said non-transitory medium; and
- using the computer for playing a game based on said information and said new information by accepting inputs indicative of game play of a simulated sports game, and producing an output that allows viewing the simulated sports game that is played using said inputs and also using said information from said non-transitory medium and said new information from said non-transitory medium.

19. A method as in claim 18, wherein said actual games are games of team play, and said actions include positions of at least multiple different players during said sports games at multiple different times during the sports game, and indicates whether said players have control of a ball at said multiple different times.

20. A method as in claim 18, wherein said non-transitory medium also stores video information for game play of the simulated sports game, and said game playing computer controls playing said video information as part of said viewing.

21. A method as in claim 18, wherein said inputs cause changing a characteristic of said actions that occurred during said actual games, and said playing comprises playing said game with changed characteristics.

22. A method as in claim 21, wherein said inputs change positions of players relative to their positions indicated by said information of actions during the actual game.

* * * * *